US012725977B2

(12) United States Patent
Ikari et al.

(10) Patent No.: US 12,725,977 B2
(45) Date of Patent: Sep. 1, 2026

(54) ELECTRICAL CONNECTOR

(71) Applicant: I-PEX Inc., Kyoto (JP)

(72) Inventors: Hiroharu Ikari, Ogori-city (JP); Hiroshi Wada, Ogori-city (JP)

(*) Notice: Subject to any disclaimer, the term of this patent is extended or adjusted under 35 U.S.C. 154(b) by 391 days.

(21) Appl. No.: 18/366,605

(22) Filed: Aug. 7, 2023

(65) Prior Publication Data

US 2023/0387632 A1 Nov. 30, 2023

Related U.S. Application Data

(63) Continuation of application No. PCT/JP2022/005191, filed on Feb. 9, 2022.

(30) Foreign Application Priority Data

Feb. 12, 2021 (JP) ................................ 2021-021108

(51) Int. Cl.

*H01R 13/6471* (2011.01)
*H01R 12/71* (2011.01)
*H01R 13/405* (2006.01)

(52) U.S. Cl.

CPC ....... *H01R 13/6471* (2013.01); *H01R 12/716* (2013.01); *H01R 13/405* (2013.01)

(58) Field of Classification Search

CPC . H01R 13/6471; H01R 12/716; H01R 13/405
See application file for complete search history.

(56) References Cited

U.S. PATENT DOCUMENTS 10,305,209 B2 * 5/2019 Ishishita .............. H01R 12/774
10,530,082 B2 * 1/2020 Motoyama ............. H01R 12/79

(Continued)

FOREIGN PATENT DOCUMENTS

JP 2002-170640 6/2002
JP 2005-019075 1/2005

(Continued)

OTHER PUBLICATIONS

International Search Report dated Apr. 26, 2022 for PCT/JP2022/005191.

(Continued)

*Primary Examiner* — Abdullah A Riyami
*Assistant Examiner* — Nelson R. Burgos-Guntin
(74) *Attorney, Agent, or Firm* — SHIPWAY IP

(57) ABSTRACT

A connector including: an insulating housing including a facing surface configured to face a circuit board; and a plurality of conductive contacts held by the insulating housing to align along an arrangement direction parallel to the facing surface, wherein the plurality of conductive contacts include: a first signal contact configured to be connected to a first signal conductor of the circuit board; a second signal contact configured to be connected to a second signal conductor of the circuit board; and a ground contact configured to be connected to a ground conductor of the circuit board, and wherein the ground contact is located between the first signal contact and the second signal contact and extends to be perpendicular to the arrangement direction to form a partition wall between the first signal contact and the second signal contact.

20 Claims, 13 Drawing Sheets

(56) References Cited

U.S. PATENT DOCUMENTS

| | | | | |
|---|---|---|---|---|
| 2004/0166700 | A1* | 8/2004 | Haga | H01R 13/6585 439/59 |
| 2007/0105433 | A1 | 5/2007 | Shioda et al. | |
| 2009/0068890 | A1 | 3/2009 | Horiuchi et al. | |
| 2011/0034076 | A1* | 2/2011 | Tagawa | H01R 13/658 439/607.01 |
| 2011/0223777 | A1* | 9/2011 | Ikari | H01R 12/79 439/59 |
| 2012/0058679 | A1* | 3/2012 | Ikari | H01R 43/20 29/874 |
| 2012/0094519 | A1* | 4/2012 | Ikari | H01R 13/6591 439/297 |
| 2012/0329300 | A1* | 12/2012 | Ikari | H01R 12/774 439/153 |
| 2015/0364846 | A1 | 12/2015 | Chen et al. | |
| 2017/0033508 | A1* | 2/2017 | Hsu | H01R 13/6585 |
| 2019/0190208 | A1* | 6/2019 | Muro | H01R 13/6581 |
| 2019/0334289 | A1* | 10/2019 | Uchida | H01R 13/6585 |
| 2019/0372270 | A1* | 12/2019 | Masunaga | H01R 13/627 |
| 2020/0006899 | A1* | 1/2020 | Muro | H01R 13/6581 |
| 2021/0249803 | A1 | 8/2021 | Kojima et al. | |

FOREIGN PATENT DOCUMENTS

| | | |
|---|---|---|
| JP | 2007-128832 | 5/2007 |
| JP | 2009-081125 | 4/2009 |
| JP | 2009-295385 | 12/2009 |
| JP | 2013-152947 | 8/2013 |
| JP | 2019-009037 | 1/2019 |
| JP | 2019-075315 | 5/2019 |
| JP | 2019-175566 | 10/2019 |
| JP | 2019-192560 | 10/2019 |
| WO | 2017/146540 | 8/2017 |
| WO | 2019/208091 | 10/2019 |

OTHER PUBLICATIONS

International Preliminary Report on Patentability with Written Opinion dated Aug. 24, 2023 for PCT/JP2022/005191.

* cited by examiner

ELECTRICAL CONNECTOR

CROSS-REFERENCE TO RELATED APPLICATIONS

This application is a continuation application of PCT Application No. PCT/JP2022/005191, filed on Feb. 9, 2022, which claims the benefit of priority from Japanese Patent Application No. 2021-021108, filed on Feb. 12, 2021. The entire contents of the above listed PCT and priority applications are incorporated herein by reference.

BACKGROUND

Field

The present disclosure relates to a connector and a connector device.

Description of the Related Art

Japanese Unexamined Patent Publication No. 2019-175566 discloses an electric connector including a plurality of conductive contacts arranged in a row, an insulating housing holding the contacts, and conductive wall portions erected on a circuit board at both ends of the array of the contacts and a portion partitioning the contacts for each transmitted signal.

SUMMARY

Disclosed herein is a connector. The connector may include: an insulating housing including a facing surface configured to face a circuit board; and a plurality of conductive contacts held by the insulating housing so as to align along an arrangement direction that is parallel to the facing surface, wherein the plurality of conductive contacts include: a first signal contact including a first connection portion configured to be connected to a first signal conductor of the circuit board and a first contact portion configured to contact a first mate signal contact of a mate connector; a second signal contact including a second connection portion configured to be connected to a second signal conductor of the circuit board and a second contact portion configured to contact a second mate signal contact of the mate connector; and a ground contact including a ground connection portion configured to be connected to a ground conductor of the circuit board and a ground contact portion configured to contact a mate ground contact of the mate connector, and wherein the ground contact is located between the first signal contact and the second signal contact and extends to be perpendicular to the arrangement direction to form a partition wall between a first region including the first signal contact and a second region including the second signal contact.

DETAILED DESCRIPTION

In the following description, with reference to the drawings, the same reference numbers are assigned to the same components or to similar components having the same function, and overlapping description is omitted.

Connector Device

Figure 1:
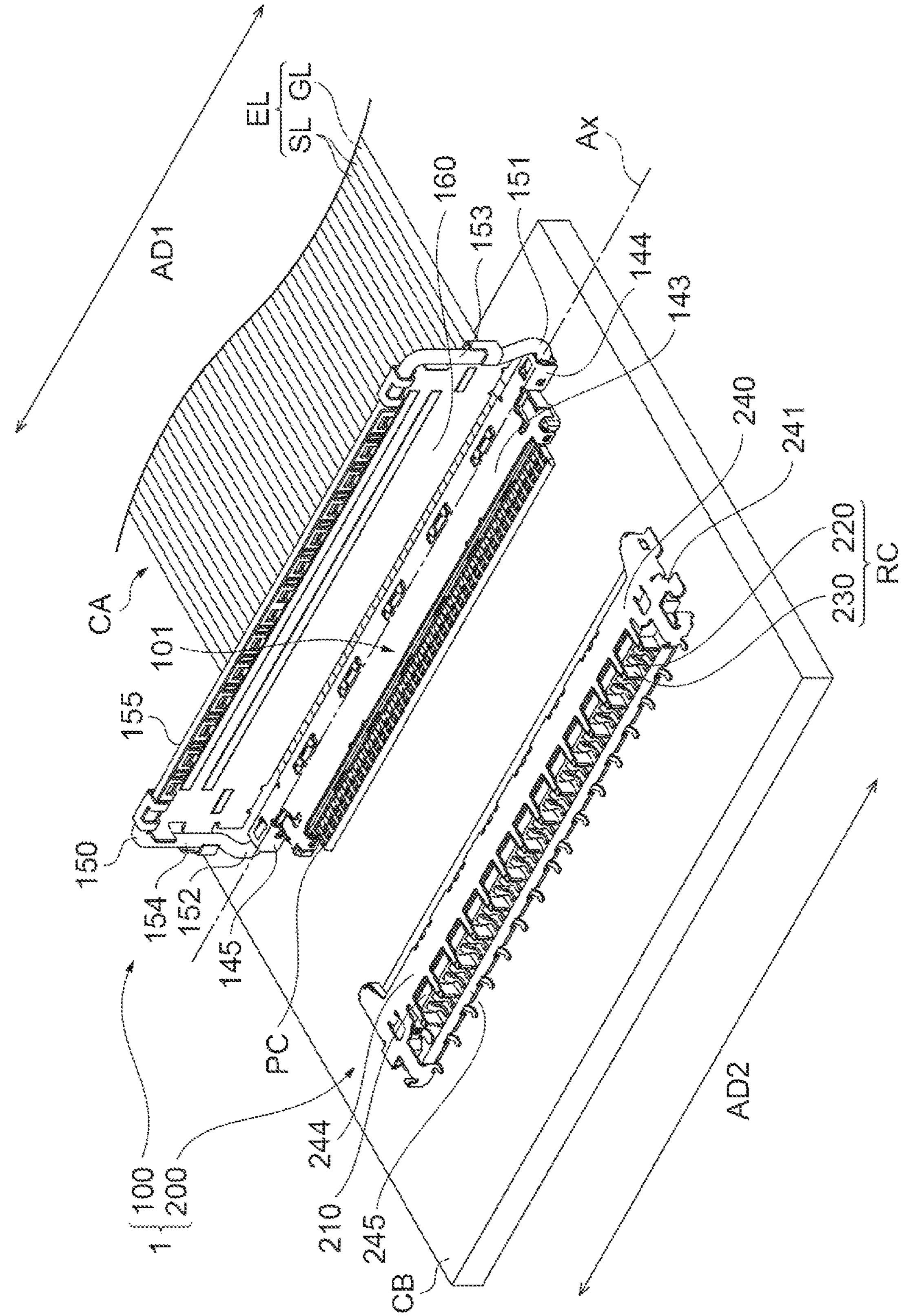
FIG. 1 is a perspective view illustrating an example of a connector device.

A connector device 1 illustrated in FIG. 1 is a device for connecting a circuit board and a cable. The connector device 1 may be a device that connects a circuit board and a circuit board, but in the following description, a device that connects a circuit board and a cable is described. The connector device 1 includes a plug connector 100 and a receptacle connector 200.

The receptacle connector 200 is attached to one side of a circuit board CB. The plug connector 100 is connected to one end of a cable CA where the other end is electrically connected to a mate device (for example, a mate circuit board). When the plug connector 100 is connected to the receptacle connector 200, the cable CA is electrically connected to the circuit board CB and the mate device is electrically connected to the circuit board CB.

The cable CA includes a plurality of electric wires EL. The electric wires EL include a signal line SL connected to a signal line of the mate device and a ground line GL connected to a ground line of the mate device. The electric wires EL may include a plurality of signal lines SL and a plurality of ground lines GL.

Plug Connector

Figure 2:
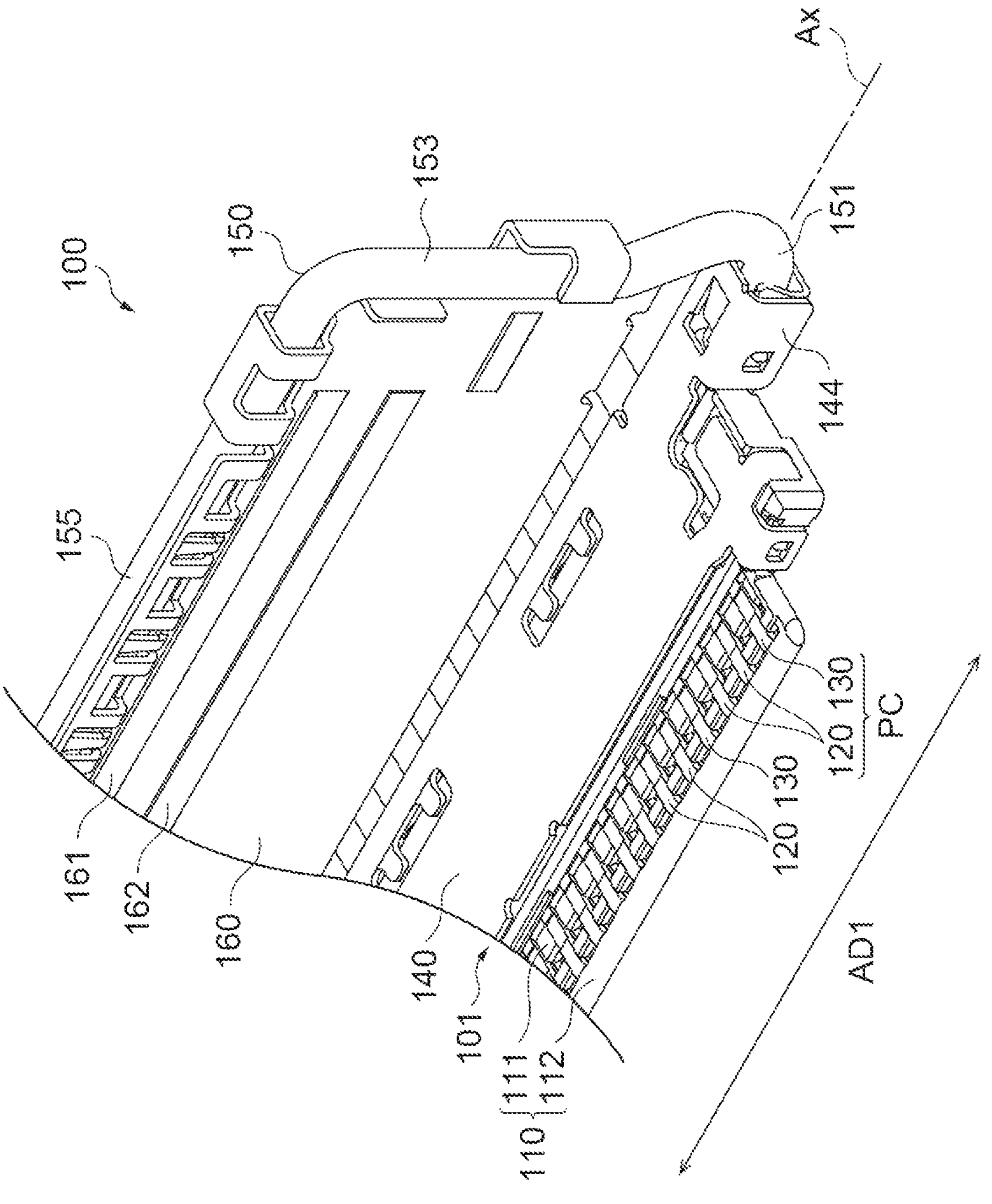
FIG. 2 is an enlarged view of a main part of a plug connector in FIG. 1.

As illustrated in FIGS. 1 and 2, the plug connector 100 (a mate connector) includes a main body 101, a lock bar 150, and a cover 160. The main body 101 is connected to the receptacle connector 200. The main body 101 includes a plurality of contacts PC (mate contacts), an insulating housing 110 (a mate insulating housing), and a shell 140 (a mate shell).

The contacts PC are formed of a conductive material (for example, a metallic material such as copper) and electrically connects the plurality of electric wires EL to conductors of the circuit board CB, respectively. The contacts PC are held by the insulating housing 110 so as to be arranged linearly along an arrangement direction AD1. The contacts PC may be incorporated into the insulating housing 110 after molding by press fitting, or may be incorporated into the insulating housing 110 by insert molding.

The insulating housing 110 is made of an insulating material such as resin and includes a base portion 111 and an insertion portion 112. The base portion 111 extends along the arrangement direction AD1 and holds the contacts PC. The insertion portion 112 projects from the base portion 111 in a direction perpendicular to the arrangement direction AD1.

Hereinafter, for convenience of description, the direction in which the insertion portion 112 projects from the base portion 111 is referred to as "front" of the plug connector 100, and the opposite direction is referred to as "rear" of the plug connector 100. A direction that intersects the front-rear direction and the arrangement direction AD1 and is directed toward one side is referred to as an "upper side" of the plug connector 100, and an opposite direction is referred to as a "lower side" of the plug connector 100.

The contacts PC include a plurality of signal contacts 120 (mate signal contacts) respectively connected to the signal lines SL and a plurality of ground contacts 130 respectively connected to the ground lines GL.

The ground contacts 130 include at least one ground contact 130 located between signal contacts 120 that are adjacent along the arrangement direction AD1. The ground contacts 130 may include two or more ground contacts 130, each located between the signal contacts 120. The ground contacts 130 may further include one ground contact 130 located at one end in the arrangement direction AD1. The ground contacts 130 may include two ground contacts 130 each located at opposite ends in the arrangement direction AD1.

The signal contacts 120 and the ground contacts 130 may be alternately arranged along the arrangement direction AD1. A plurality of sets of the signal contacts 120, each set including a plurality of signal contact 120, and the ground contacts 130 may be alternately arranged along the arrangement direction AD1. For example, in FIGS. 1 and 2, thirteen sets of the signal contacts 120, each set including two signal contacts 120, and fourteen ground contact 130 are alternately arranged along the arrangement direction AD1. One set of the signal contacts 120 may include three or more signal contacts 120.

Figure 6:
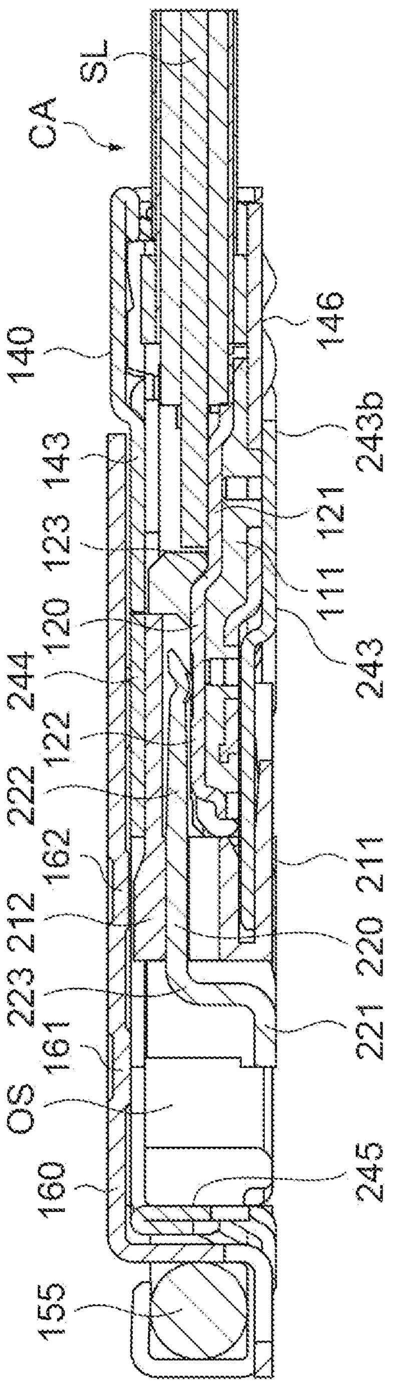
FIG. 6 is a sectional view taken along line VI-VI in FIG. 5.
Figure 8:
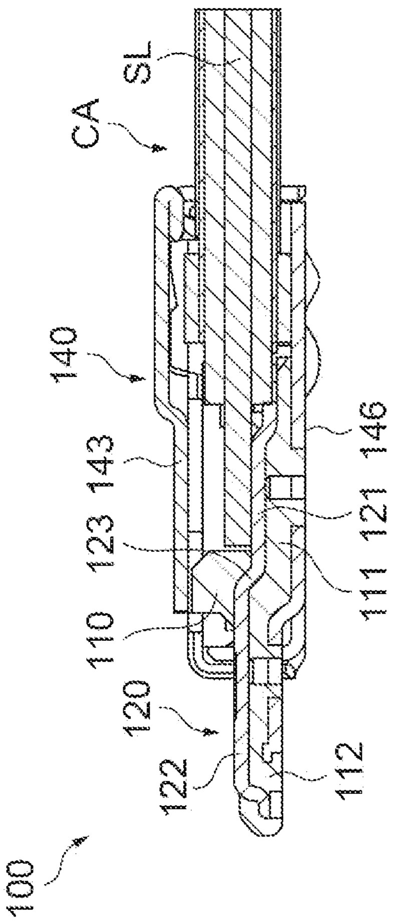
FIG. 8 is a diagram illustrating the plug connector in FIG. 6.

Each of the signal contacts 120 is formed of a metallic thin plate and is held by the insulating housing 110 such that the thickness direction thereof is perpendicular to the arrangement direction AD1. As illustrated in FIGS. 6 and 8, the signal contact 120 extends from the base portion 111 to the insertion portion 112.

The signal contact 120 includes a connection portion 121 held by the base portion 111, a contact portion 122 exposed on an upper surface of the insertion portion 112, and a coupling portion 123 coupling the connection portion 121 and the contact portion 122. The connection portion 121 is connected to a conductor of the corresponding the signal line SL. The contact portion 122 contacts a signal contact of the receptacle connector 200 (a mate connector).

Figure 7:
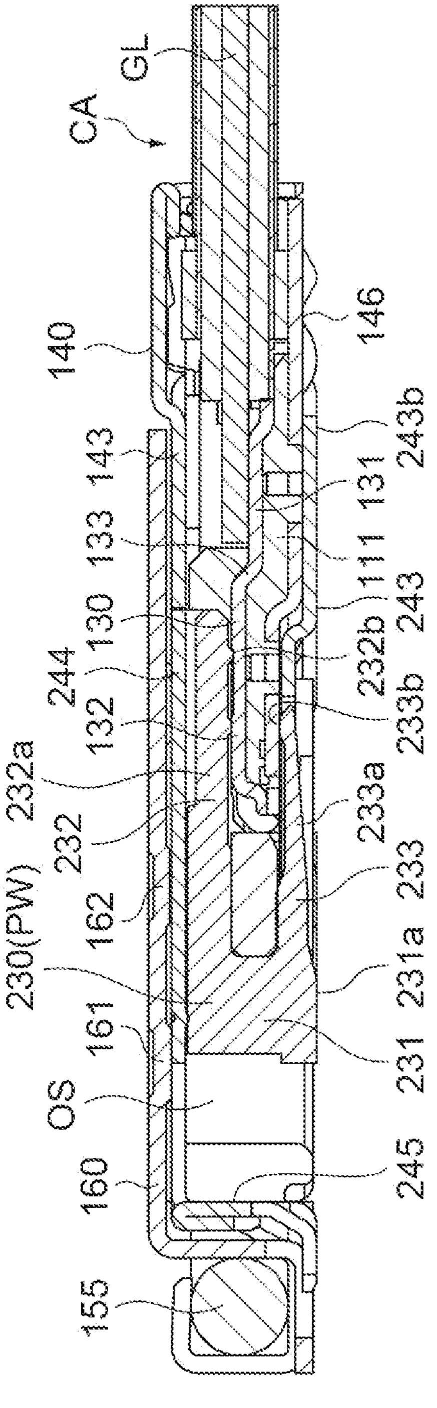
FIG. 7 is a sectional view taken along line VII-VII in FIG. 5.
Figure 10:
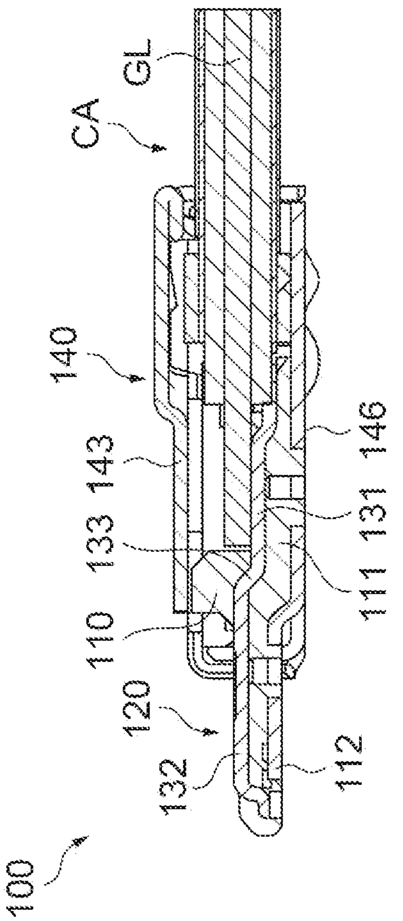
FIG. 10 is a diagram illustrating the plug connector in FIG. 7.

As illustrated in FIGS. 7 and 10, each of the ground contacts 130 is formed of a metallic thin plate and is held by the insulating housing 110 such that the thickness direction thereof is perpendicular to the arrangement direction AD1. The ground contact 130 extends from the base portion 111 to the insertion portion 112.

The ground contact 130 includes a connection portion 131 held by the base portion 111, a contact portion 132 exposed on the upper surface of the insertion portion 112, and a coupling portion 133 coupling the connection portion 131 and the contact portion 132. The connection portion 131 is connected to the conductor of the corresponding ground line GL. The contact portion 132 contacts the ground contact of the receptacle connector 200 (the mate connector).

Figure 5:
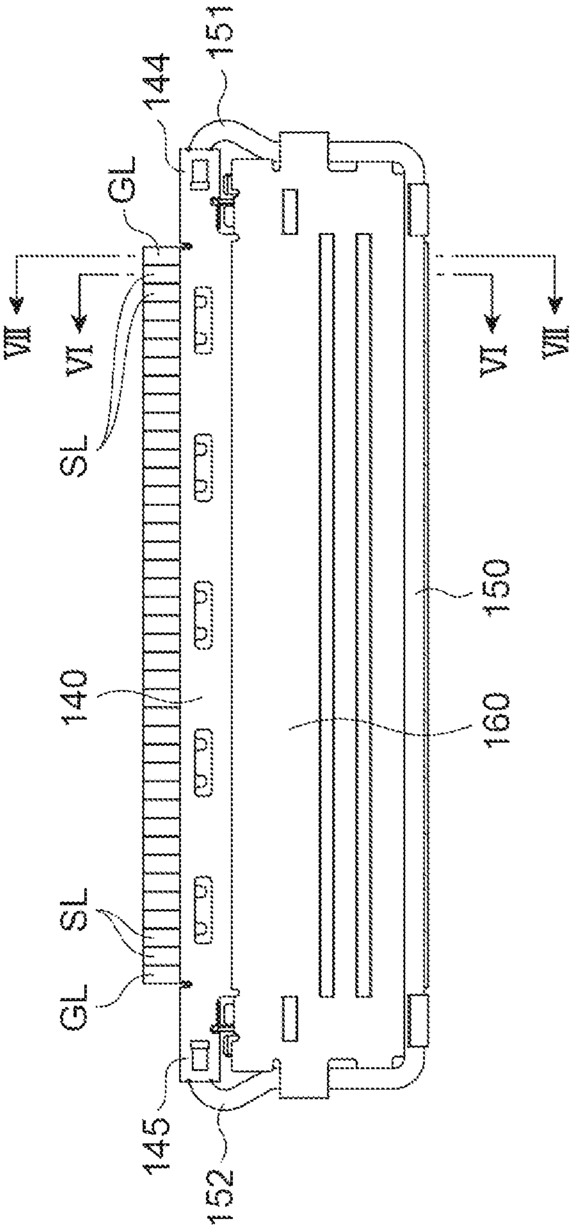
FIG. 5 is a plan view illustrating a state in which a lock bar in FIG. 4 is fitted into the receptacle connector.

The shell 140 is conductive and houses the insulating housing 110. For example, the shell 140 is formed of a conductive material (for example, a metallic material such as copper), and includes a lower plate 146, an upper plate 143, and shaft holders 144, 145 (see FIG. 5).

The lower plate 146 (mate plate) covers a lower surface of the insulating housing 110. For example, the lower plate 146 is formed by a metallic thin plate and covers at least a part of the lower surface of the base portion 111 and at least a part of the lower surface of the insertion portion 112. The lower plate 146 may be attached to the insulating housing 110 after molding, or may be attached to the insulating housing 110 by insert molding. The upper plate 143 covers the upper surface of the insulating housing 110. For example, the upper plate 143 is formed by a metallic thin plate and covers at least a part of an upper surface of the base portion 111.

As illustrated in FIGS. 1 and 2, the shaft holders 144, 145 are provided at both ends of the shell 140 in the arrangement direction AD1. The shaft holders 144, 145 hold the lock bar 150 described below so as to be rotatable about an axis Ax parallel to the arrangement direction AD1. Each of the shaft holders 144, 145 is formed integrally with the upper plate 143, for example by bending a thin sheet forming the upper plate 143. The upper plate 143 and the shaft holders 144, 145 may be attached to the insulating housing 110 after molding, or may be attached to the insulating housing 110 by insert molding.

The lock bar 150 holds the receptacle connector 200 with the main body 101 connected to the receptacle connector 200 to prevent removal of the plug connector 100 from the receptacle connector 200. For example, the lock bar 150 is formed by bending a metallic rod, and includes a shaft 151, a shaft 152, side bars 153, 154, and a coupling bar 155. The shafts 151, 152 are each held by the shaft holders 144, 145 so as to be rotatable about an axis parallel to the arrangement direction AD1. The side bars 153, 154 are each bent with respect to the shaft holders 144, 145 so as to be directed in a direction intersecting the axis Ax. The coupling bar 155 extends parallel to the axis Ax and connects the end of a shaft holder 144 and the end of a shaft holder 145.

As described below, the main body 101 of the plug connector 100 is connected to the receptacle connector 200 toward the front direction (see FIG. 4). With the plug connector 100 connected to the receptacle connector 200, the lock bar 150 is tilted toward the front until the coupling bar 155 sandwiches the receptacle connector 200 with the main body 101 (see FIGS. 6 and 7). As a result, movement toward the rear of the main body 101 is restricted, thereby preventing the plug connector 100 from coming off the receptacle connector 200.

The cover 160 is provided in the lock bar 150 so as to cover the coupling bar 155 and the main body 101 from above in a state in which the lock bar 150 falls toward the front. For example, the cover 160 is formed of a metallic thin plate, and is attached to the side bars 153, 154 and the coupling bar 155 by a partial bending process so as to cover an upper surface (upper surface in a state of being tilted toward the front) of the lock bar 150.

Receptacle Connector

Figure 3:
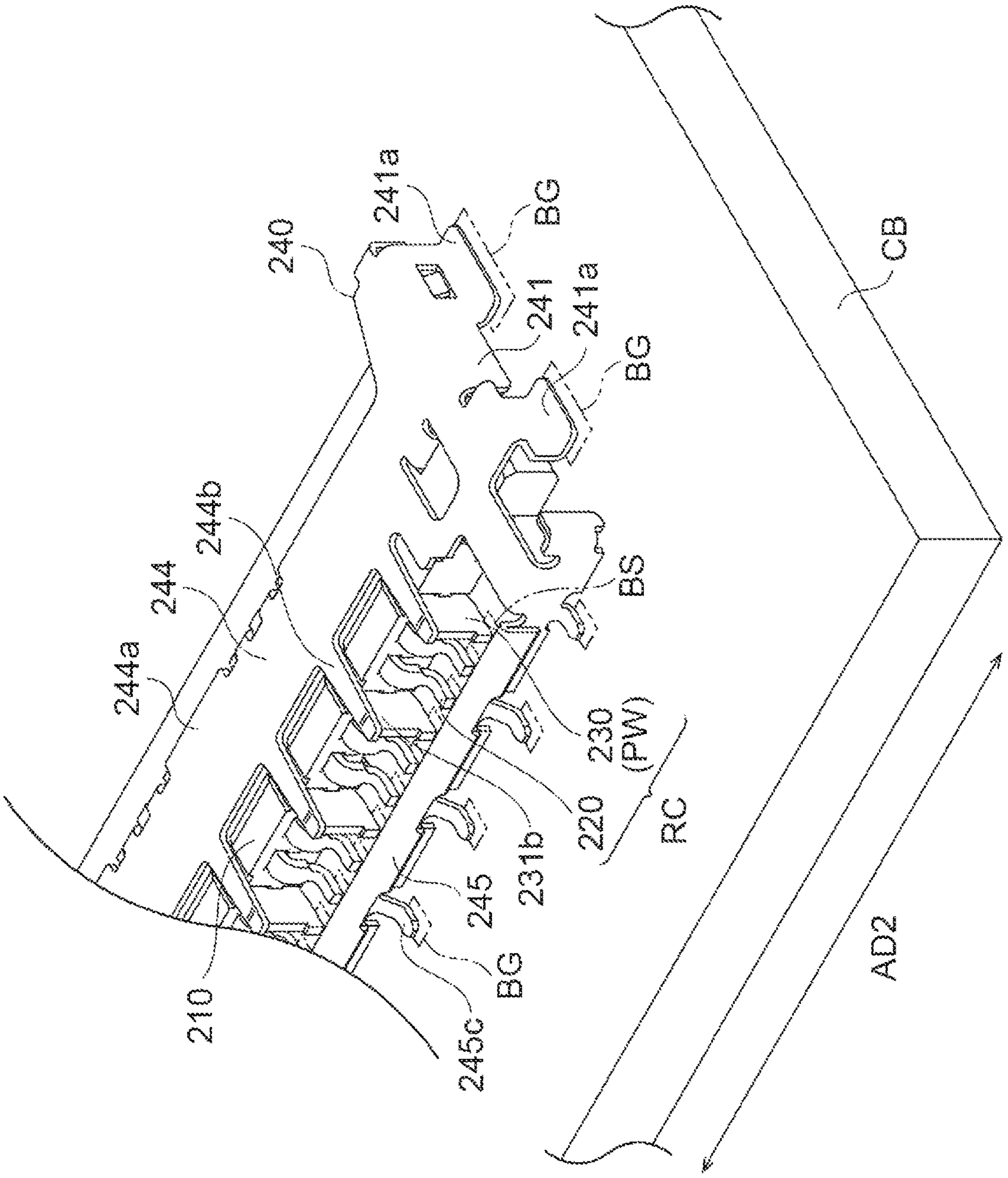
FIG. 3 is an enlarged view of a main part of a receptacle connector in FIG. 1.

As illustrated in FIGS. 1 and 3, the receptacle connector 200 includes a plurality of contacts RC, an insulating housing 210, and a shell 240. The contacts RC are formed of a conductive material (for example, a metallic material such as copper), and electrically connect conductors of the circuit board CB to each of the electric wires EL. The contacts RC are held by the insulating housing 210 so as to be arranged along the arrangement direction AD2 linearly. The contacts RC may be incorporated into the insulating housing 210 after molding by press fitting, or may be incorporated into the insulating housing 210 by insert molding.

The insulating housing 210 is formed of an insulating material such as resin. The insulating housing 210 includes a receiving space 213 extending along the arrangement direction AD2 and opening towards a direction perpendicular to the arrangement direction AD2 (see FIGS. 9 and 11).

Hereinafter, for convenience of description, the direction in which the receiving space 213 opens is referred to as "front" of the receptacle connector 200, and the opposite direction is referred to as "rear" of the receptacle connector 200. A direction that intersects the front-rear direction and the arrangement direction AD2 and is directed toward one side is referred to as an "upper side" of the receptacle connector 200, and an opposite direction is referred to as a "lower side" of the receptacle connector 200.

Figure 4:
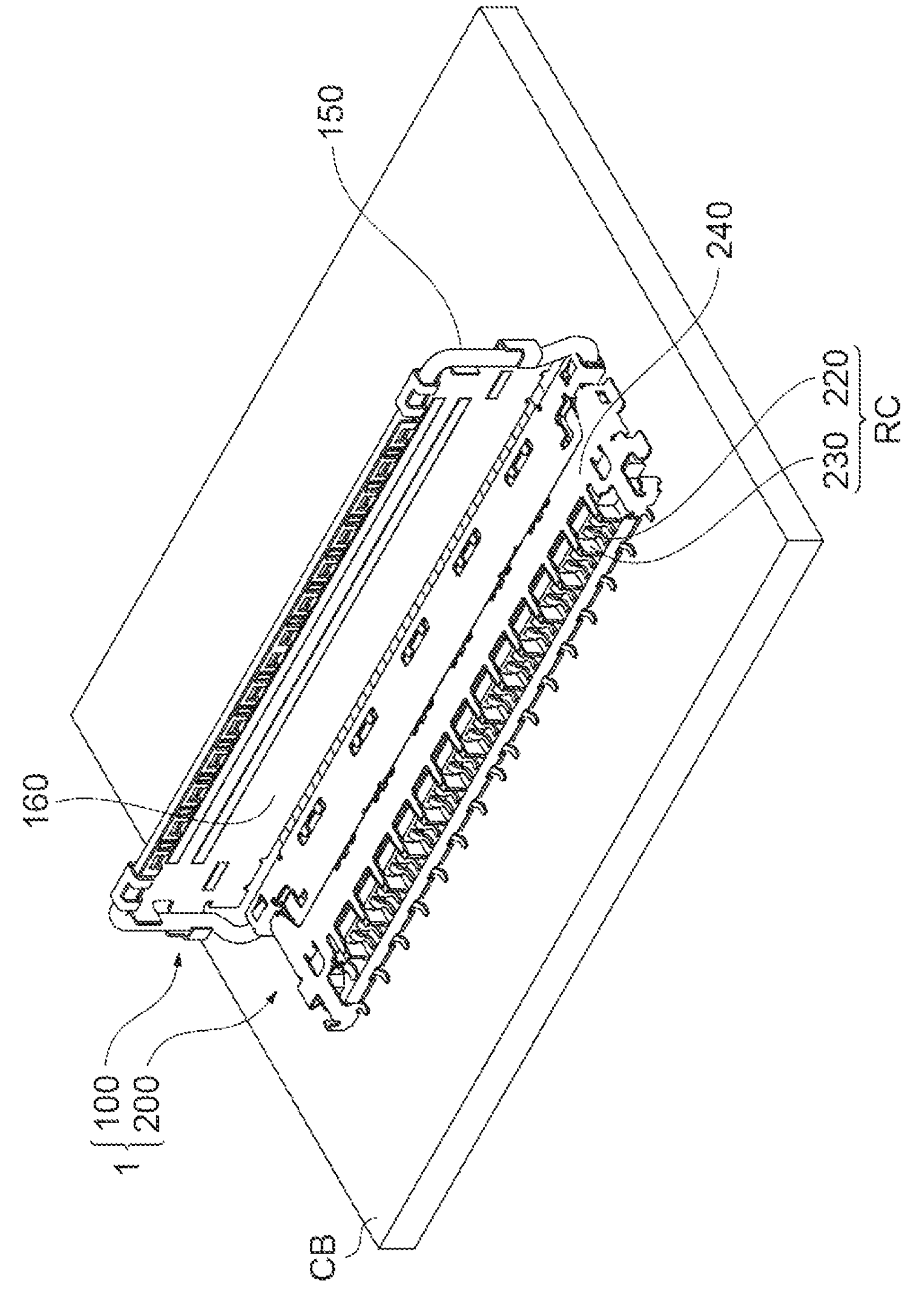
FIG. 4 is a perspective view illustrating a state in which the receptacle connector and the plug connector in FIG. 1 are fitted to each other.

The receiving space 213 receives the insertion portion 112 of the plug connector 100 from the front (see FIG. 4). For example, the insertion portion 112 is inserted into the receiving space 213 toward the front along the front-rear direction of the plug connector 100.

Figure 9:
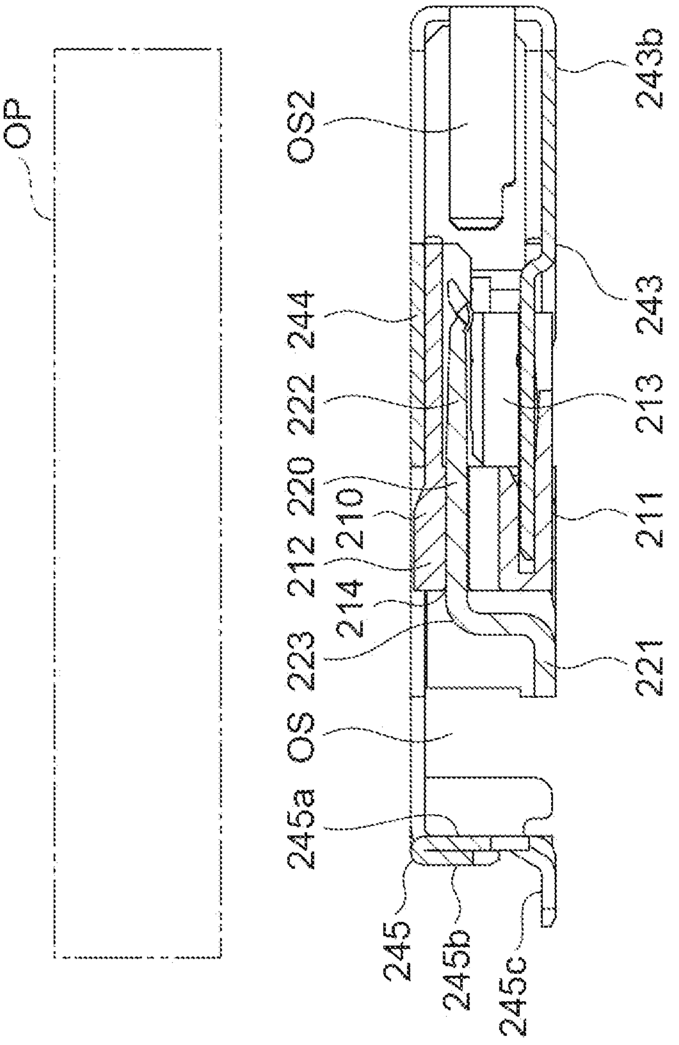
FIG. 9 is a diagram illustrating the receptacle connector in FIG. 6.

The insulating housing 210 has a lower surface 211 (a facing surface) facing downwardly and an upper surface 212 which is the opposite surface of the lower surface 211 and is facing upwardly (see FIGS. 6 and 9). The lower surface 211 and the upper surface 212 are parallel to the arrangement direction AD2. In a state where the receptacle connector 200 is attached to the mounting surface of the circuit board CB, the lower surface 211 faces the mounting surface of the circuit board CB.

Conductors of the circuit board CB conductor includes a plurality of signal conductors BS and a ground conductor BG (see FIG. 3). The contacts RC include a plurality of signal contacts 220 respectively connected to the signal conductors BS of the circuit board CB and a plurality of ground contacts 230 respectively connected to the ground conductor BG of the circuit board CB.

The ground contacts 230 include at least one ground contact 230 located between the signal contacts 220 that are adjacent along the arrangement direction AD2. The ground contacts 230 may include two or more ground contacts 230, each located between the signal contacts 220. The ground contacts 230 may further include one ground contact 230 located at one end in the arrangement direction AD2. The ground contacts 230 may include two ground contacts 230 located at opposite ends in the arrangement direction AD2.

The signal contacts 220 and the ground contacts 230 may be alternately arranged along the arrangement direction AD2. A plurality of sets of the signal contacts 220, each set including a plurality of signal contacts 220, and the ground contacts 230 may alternate along the arrangement direction AD2. For example, in FIGS. 1 and 3, thirteen sets of the signal contact 220, each including two signal contacts 220, and fourteen ground contacts 230 alternate along the arrangement direction AD2. A set of the signal contacts 220 may include three or more signal contacts 120. Hereinafter, in the description of the signal contact 220 and the ground contact 230, two signal contacts 220 adjacent to each other with the ground contact 230 therebetween may be referred to as "a first signal contact 220" and "a second signal contact 220".

In a state where the plug connector 100 is connected to the receptacle connector 200, the signal contacts 120 contact the signal contacts 220, respectively. Thus, the signal lines SL are electrically connected to the signal conductors BS of the circuit board CB, respectively. The ground contacts 130 contact the ground contacts 230, respectively. Thus, the ground lines GL are electrically connected to the ground conductor BG of the circuit board CB, respectively.

Each of the signal contacts 220 is formed of a metallic thin plate and is held by the insulating housing 210 such that the thickness direction thereof is perpendicular to the arrangement direction AD2. As illustrated in FIGS. 6 and 9, the signal contact 220 includes a connection portion 221, a contact portion 222, and a coupling portion 223. The contact portion 222 is held by the insulating housing 210 along the front-rear direction, and the rear end of the contact portion 222 is exposed at the top of the receiving space 213.

Figure 12:
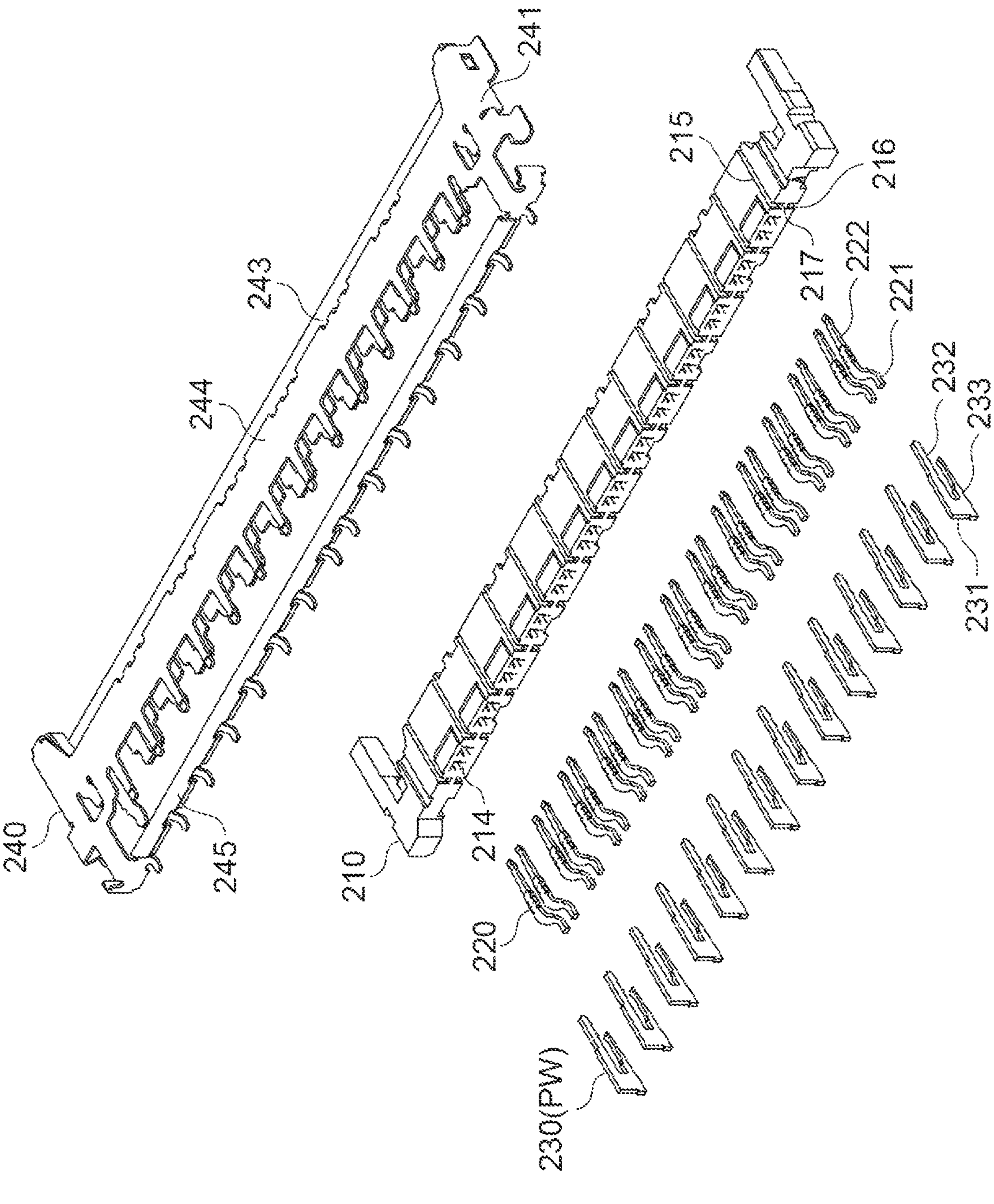
FIG. 12 is an exploded view of the receptacle connector in FIG. 1.

For example, a holding hole 214 is formed at a location corresponding to each of the signal contacts 220 in the insulating housing 210 (see FIG. 12). The holding hole 214 passes through the insulating housing 210 along the front-rear direction to provide communication between the top of the receiving space 213 and the space in the rear of the insulating housing 210 (hereinafter referred to as "a rear external space OS"). The contact portion 222 of each of the signal contacts 220 is held within the holding hole 214 (see FIG. 9).

The connection portion 221 is located outside of the insulating housing 210 when viewed from a direction perpendicular to the lower surface 211 (for example, above). For example, the connection portion 221 extends toward the rear from the insulating housing 210 in the vicinity of the lower surface 211 and is located in the rear external space OS. The coupling portion 223 extends in the vertical direction to connect the connection portion 221 and the contact portion 222. The term "located outside" means that at least a part thereof protrudes from the outer surface of the insulating housing 210 and is visible from the periphery of the insulating housing 210.

As illustrated in FIG. 3, the connection portion 221 is connected to the corresponding the signal conductor BS by soldering or the like. For example, the connection portion 221 of the first signal contact 220 (a first connection portion 221) is connected to one the signal conductor BS (a first signal conductor BS), and the connection portion 221 of the second signal contact 220 (a second connection portion 221) is connected to one the signal conductor BS (a second signal conductor BS).

As illustrated in FIG. 6, at least a portion of the lower surface of the contact portion 222 contacts the contact portion 122 of the corresponding the signal contact 120 when the insertion portion 112 is inserted into the receiving space 213. For example, the contact portion 222 of the first signal contact 220 (a first contact portion 222) contacts the contact portion 122 of one signal contact 120 (a first mate signal contact) and the contact portion 222 of the second signal contact 220 (a second contact portion 222) contacts the contact portion 122 of one the signal contact 120 (a second mate signal contact).

Figure 11:
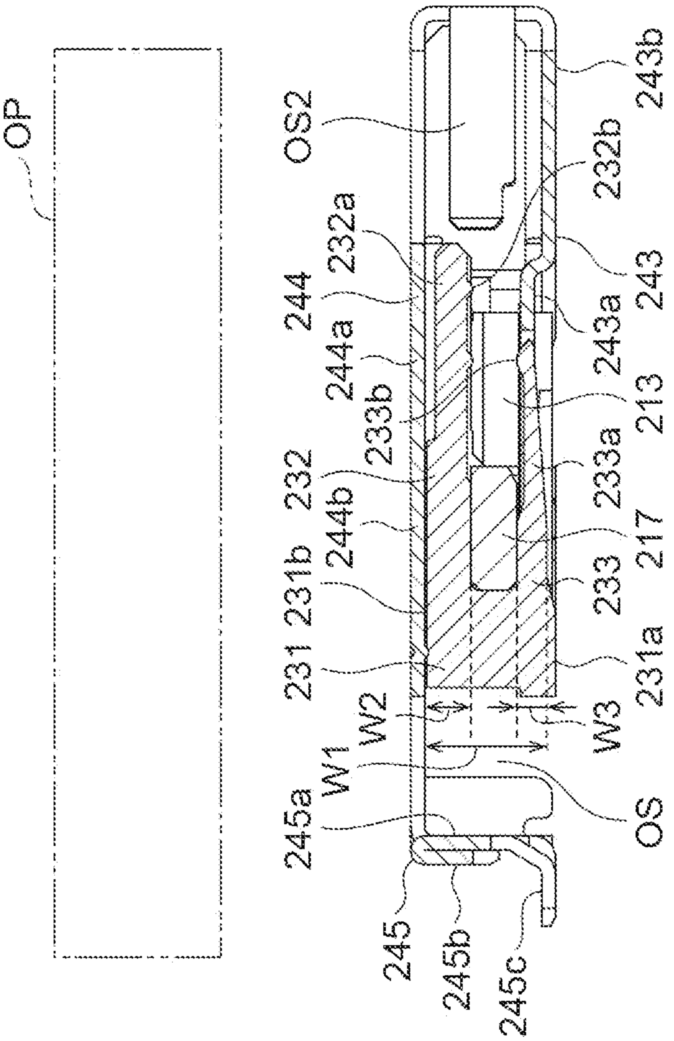
FIG. 11 is a diagram illustrating the receptacle connector in FIG. 7.

As illustrated in FIGS. 7 and 11, each of the ground contacts 230 includes a ground connection portion 231*a* and a ground contact portion 232*b*. The ground connection portion 231*a* is connected to the ground conductor BG of the circuit board CB. The ground contact portion 232*b* contacts the corresponding ground contact 130.

As illustrated in FIG. 3, the ground contact 230 extends along a plane OP perpendicular to the arrangement direction AD2 so as to form a partition wall PW between a region including the first signal contact 220 and a region including the second signal contact 220 when positioned between signal contacts 220 that are adjacent along the arrangement direction AD2 (between the first signal contact 220 and the second signal contact 220). For example, each of the ground contact 230*s* is formed of a metallic thin plate and is held by the insulating housing 210 such that the thickness direction thereof is along the arrangement direction AD2.

As illustrated in FIG. 11, for example, the ground contact 230 includes a first partition portion 231, a second partition portion 232, and a third partition portion 233. The first partition portion 231 is located in the rear external space OS (outside of the insulating housing 210). When the ground contact 230 is located between the first signal contact 220 and the second signal contact 220, the first partition portion 231 is located between the connection portion 221 of the first signal contact 220 (the first connection portion 221) and the connection portion 221 of the second signal contact 220 (the second connection portion 221). For example, the first partition portion 231 extends along a plane perpendicular to the arrangement direction AD2 so as to partition between a region including the first connection portion 221 and a region including the second connection portion 221 in the rear external space OS. The first partition portion 231 may extend over the entire height of the insulating housing 210 in the vertical direction.

The second partition portion 232 projects from the first partition portion 231 into the insulating housing 210 and spreads along the plane OP in the insulating housing 210. For example, the second partition portion 232 projects toward the front into the insulating housing 210 from the top of the first partition portion 231 and the end of the first partition portion 231 is exposed at the top of the receiving space 213. A width W1 of the first partition portion 231 in the direction perpendicular to the lower surface 211 may be greater than a width W2 of the second partition portion 232 in the direction perpendicular to the lower surface 211.

When the ground contact 230 is located between the first signal contact 220 and the second signal contact 220, the second partition portion 232 is located between the contact portion 222 of the first signal contact 220 (the first contact portion 222) and the contact portion 222 of the second signal contact 220 (the second contact portion 222).

The third partition portion 233 projects from the first partition portion 231 into the insulating housing 210, is located between the second partition portion 232 and the circuit board CB, and extends along the plane OP in the insulating housing 210. For example, the third partition portion 233 projects toward the front into the insulating housing 210 from the bottom of the first partition portion 231, and the end of the third partition portion 233 is exposed at the bottom of the receiving space 213. The width W1 of the first partition portion 231 in the direction perpendicular to the lower surface 211 may be greater than the sum of the width W2 of the second partition portion 232 in the direction perpendicular to the lower surface 211 and a width W3 of the third partition portion 233 in the direction perpendicular to the lower surface 211.

The insulating housing 210 may include a regulating portion 217 located between the second partition portion 232 and the third partition portion 233 that restricts displacements in the up and down directions of the ground contact 230. For example, holding grooves 215, 216 are formed at locations corresponding to each of a plurality of the ground contact 230 in the insulating housing 210 (see FIG. 12).

The holding groove 215 is formed in an upper portion of the insulating housing 210 along the front-rear direction and communicates with the receiving space 213. The holding groove 216 is formed in a lower portion of the insulating housing 210 along the front-rear direction and communicates with the receiving space 213. The regulating portion 217 is formed between the bottom surface of the holding groove 215 and the bottom surface of the holding groove 216. For example, in each of the plurality of the ground contact 230, the second partition portion 232 is held in the holding groove 215, the third partition portion 233 is held in the holding groove 216, and the regulating portion 217 is located between the second partition portion 232 and the third partition portion 233.

As illustrated in FIG. 11, the above-described the ground connection portion 231*a* is formed in the first partition portion 231. For example, the ground connection portion 231*a* is formed at the lower edge of the first partition portion 231.

The above-described the ground contact portion 232*b* is formed in the second partition portion 232. For example, the ground contact portion 232*b* is formed in a portion of the second partition portion 232 facing the third partition portion 233. For example, the ground contact portion 232*b* is formed on a lower edge of a portion of the second partition portion 232 located within the receiving space 213.

As illustrated in FIG. 7, with the insertion portion 112 inserted into the receiving space 213, the contact portion 132 of the ground contact 130 is positioned between the second partition portion 232 and the third partition portion 233 of the corresponding the ground contact 230. The ground contact portion 232*b* contacts the contact portion 132 of the corresponding ground contact 130.

The second partition portion 232 may include a plurality of the ground contact portions 232*b*. For example, each of the ground contact portions 232*b* contacts the contact portion 132. For example, the second partition portion 232 may include the ground contact portions 232*b* aligned in the front-rear direction at the lower edge of the portion located within the receiving space 213. FIG. 7 illustrates a case where the second partition portion 232 include two ground contact portions 232*b*.

The third partition portion 233 may be formed with a mate shell contact portion 233*b* that contacts the shell 140 of the plug connector 100. The mate shell contact portion 233*b* may be formed in a portion of the third partition portion 233 facing the second partition portion 232. For example, the mate shell contact portion 233*b* is formed on an upper edge of a portion of the third partition portion 233 located within the receiving space 213.

With the insertion portion 112 inserted into the receiving space 213, the lower plate 146 of the shell 140 is placed between the contact portion 132 of the ground contact 130 and the third partition portion 233, and the mate shell contact portion 233*b* contacts the lower plate 146.

The third partition portion 233 may include a plurality of mate shell contact portions 233*b*. For example, each of the mate shell contact portions 233*b* contacts the lower plate 146. For example, the third partition portion 233 may include a plurality of mate shell contact portions 233*b* aligned in the front-rear direction at the upper edge of the portion located within the receiving space 213. FIGS. 7 and 11 illustrate a case where the third partition portion 233 includes one mate shell contact portion 233*b*.

The shell 240 is conductive and houses the insulating housing 210. For example, the shell 240 is fortified of a conductive material (for example, a metallic material such as copper), and as illustrated in FIGS. 1 and 3, the shell 240 includes an upper plate 244 (plate) and two side plates 241.

The upper plate 244 sandwiches the insulating housing 210 with the circuit board CB. The upper plate 244 extends parallel to the arrangement direction AD2. The two side plates 241 are connected to both end portions of the upper plate 244 in the arrangement direction AD2.

The side plate 241 is bent relative to the upper plate 244 so as to be at least partially perpendicular to the arrangement direction AD2. At the lower edge of the side plate 241, a connection tab 241*a* to be connected to the ground conductor BG of the circuit board CB is formed. The side plate 241 may include a plurality of the connection tab 241*a*. In FIGS. 1 and 3, a case where the side plate 241 includes the connection tabs 241*a* at two locations aligned in the front-rear direction is illustrated.

As illustrated in FIGS. 9 and 11, the shell 240 may further include a lower plate 243 (a contact plate). The lower plate 243 (the contact plate) is located between the plug connector 100 and the circuit board CB in a state where the plug connector 100 connected to the receptacle connector 200.

For example, the lower plate 243 includes an insertion portion 243*a* and a base portion 243*b*. The insertion portion 243*a* is held by the insulating housing 210 to cover at least a portion of the lower surface of the receiving space 213. The insertion portion 243*a* extends parallel to the arrangement direction AD2 in the receiving space 213. The base portion 243*b* projects from the insertion portion 243*a* into the space in front of the insulating housing 210 (hereinafter referred to as "a front external space OS2").

As illustrated in FIG. 7, in a state where the plug connector 100 connected to the receptacle connector 200, the lower plate 243 is located between the lower plate 146 and the circuit board CB in the plug connector 100. At least a portion of the lower plate 243 contacts a lower surface of the lower plate 146.

The shell 240 is integrally formed by, for example, bending a metallic thin plate. The shell 240 may be attached to the insulating housing 210 after molding, or may be attached to the insulating housing 210 by insert molding.

Figure 13:
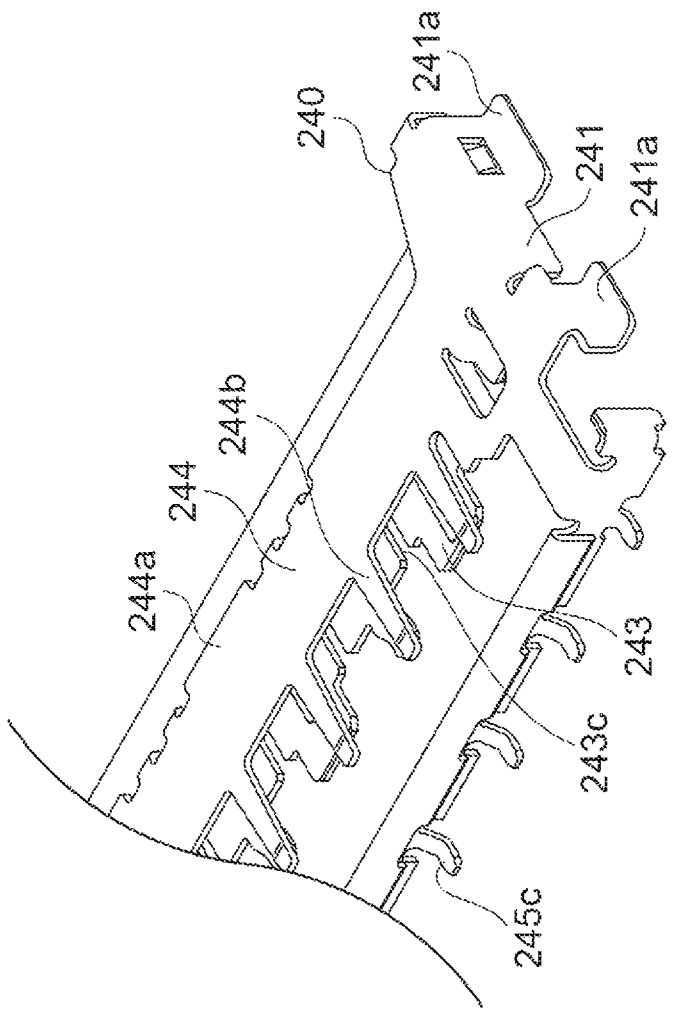
FIG. 13 is an enlarged view of a main part of a shell in FIG. 12.

As illustrated in FIGS. 12 and 13, the lower plate 243 may be formed with a slit 243*c* that houses at least a portion of the third partition portion 233. For example, in the insertion portion 243*a*, a plurality of slits 243*c* arranged along the arrangement direction AD2 are formed so as to respectively correspond to the ground contacts 230. Each of the slit 243*c* extends in the front-rear direction and is open rearward. The slits 243*c* houses the third partition portions 233 of the ground contacts 230, respectively.

Each of the ground contacts 230 may further include a shell contact portion 231*b* that contacts the shell 240. The shell contact portion 231*b* may contact the upper plate 244. For example, as illustrated in FIG. 3, the upper plate 244 includes a base portion 244*a* and a plurality of projecting portions 244*b*. The base portion 244*a* covers at least a portion of the upper surface 212 of the insulating housing 210.

The projecting portions 244*b* are spaced apart from one another and aligned with the arrangement direction AD2. The projecting portions 244*b* correspond to the ground contacts 230, respectively. Each of the projecting portions 244*b* projects rearward from the base portion 244*a* so as to sandwich the first partition portion 231 of the corresponding ground contact 230 with the circuit board CB.

In each of the ground contacts 230, the shell contact portion 231*b* is formed in the first partition portion 231 to contact a corresponding projecting portion 244*b*. For example, the shell contact portion 231*b* is formed at the upper edge of the first partition portion 231 to slightly displace the corresponding projecting portion 244*b* upward relative to the base portion 244*a*. The contact state between the shell contact portion 231*b* and the projecting portion 244*b* is maintained by the repulsive force against the elastic deformation of the projecting portion 244*b*.

While the first partition portion 231 includes the shell contact portion 231*b*, the second partition portion 232 may include a floating portion 232*a* located away from the upper plate 244, as illustrated in FIGS. 7 and 11. The floating portion 232*a* may include an end of the second partition portion 232. In the case where the second partition portion 232 includes the floating portion 232*a*, the ground contact portion 232*b* may be formed in a portion facing the third partition portion 233 in the floating portion 232*a*. For example, the ground contact portion 232*b* may be formed at the lower edge of the floating portion 232*a*. If the second partition portion 232 include a plurality of ground contact portions 232*b*, all the ground contact portions 232*b* may be formed on the lower edge of the floating portion 232*a*.

The third partition portion 233 may include a floating portion 233*a* located away from the circuit board CR The floating portion 233*a* may include an end of the third partition portion 233. If the third partition portion 233 include the floating portion 233*a*, the mate shell contact portion 233*b* may be formed on a portion facing the second partition portion 232 in the floating portion 233*a* of the third partition portion 233. For example, the mate shell contact portion 233*b* may be formed at an upper edge of the floating portion 233*a*. If the third partition portion 233 include a plurality of mate shell contact portions 233*b*, all the mate shell contact portions 233*b* may be formed on the upper edge of the floating portion 233*a*.

As illustrated in FIGS. 3 and 9, the shell 240 may further include a rear plate 245 facing the insulating housing 210 across the rear external space OS where the connection portions 221 of the signal contacts 220 and the first partition portions 231 of the ground contacts 230 are placed. For example, the rear plate 245 includes a base portion 245*a*, a reinforcing portion 245*b*, and a plurality of connection tabs 245*c*.

The base portion 245*a* faces the insulating housing 210 through the rear external space OS. The reinforcing portion 245*b* is bent relative to the base portion 245*a* at the upper edge of the base portion 245*a* and overlaps the base portion 245*a* from the rear. The connection tabs 245*c* are each connected to the ground conductor BG of the circuit board CB. For example, the connection tabs 245*c* may be arranged along a line parallel to the arrangement direction AD2 and each extend rearwardly from a lower portion of the base portion 245*a*.

Each of the connection portions 221 of the signal contacts 220 and the first partition portions 231 of the ground contacts 230 faces the base portion 245*a* with a gap in the rear external space OS.

As illustrated in FIG. 7, in a state where the plug connector 100 is connected to the receptacle connector 200 and the lock bar 150 of the plug connector 100 is tilted toward the front (toward the front in the plug connector 100), the cover 160 covers at least a part of a space (the rear external space OS) between the rear plate 245 and the insulating housing 210. The cover 160 may be configured to be electrically connected to the first partition portion 231 via the upper plate 244.

For example, the cover 160 includes two plate contact portions 161, 162 bulging downward (downward in a state where the lock bar 150 is tilted toward the front). The plate contact portions 161, 162 and the lock bar 150 are arranged one behind the other in a state in which they are tilted toward the front and extend parallel to the arrangement direction AD1. Each of the plate contact portions 161, 162 comes into contact with at least one of the projecting portions 244*b* in a state where the lock bar 150 is tilted toward the front.

As described above, the receptacle connector 200 includes: the insulating housing 210 having the lower surface 211 facing the circuit board CB; and a plurality of conductive contacts RC held in the insulating housing 210 so as to align in the arrangement direction AD2 parallel to the lower surface 211, in which the contacts RC include: the first signal contact 220 including the first connection portion 221 connected to the first signal conductor BS of the circuit board CB and the first contact portion 222 contacting the signal contact 120 (the first mate signal contact) of the plug connector 100 (the mate connector); the second signal contact 220 including the second connection portion 221 connected to the second signal conductor BS of the circuit board CB and the second contact portion 222 contacting the signal contact 120 (the second mate signal contact) of the plug connector 100; and the ground contact 230 including the ground connection portion 231*a* connected to the ground conductor BG of the circuit board CB and the ground contact portion 232*b* contacting the ground contact 130 (the mate ground contact) of the plug connector 100. The ground contact 230 is located between the first signal contact 220 and the second signal contact 220 and extends along the plane OP perpendicular to the arrangement direction AD2 so as to form the partition wall PW between the region including the first signal contact 220 and the region including the second signal contact 220.

According to the present the receptacle connector 200, by utilizing the ground contact 230 itself as a partition wall, more partition walls PW can readily be arranged between the signal contacts 220. Therefore, crosstalk may further be reduced by the receptacle connector 200.

The first connection portion 221 and the second connection portion 221 may be located outside the insulating housing 210 when viewed from a direction perpendicular to the lower surface 211. The ground contact 230 may include: the first partition portion 231 located between the first connection portion 221 and the second connection portion 221 outside the insulating housing 210 and extending along the plane OP perpendicular to the arrangement direction AD2; and the second partition portion 232 projecting from the first partition portion 231 into the insulating housing 210 to be located between the first contact portion 222 and the second contact portion 222 and extending along the plane OP perpendicular to the arrangement direction AD2. The ground connection portion 231*a* may be fortified in the first partition portion 231, and the ground contact portion 232*b* may be formed in the second partition portion 232. For example, the partition wall PW can readily be formed both outside the insulating housing 210 and inside the insulating housing 210. Therefore, the crosstalk may further be reduced.

The width of the first partition portion 231 in a direction perpendicular to the lower surface 211 may be greater than the width of the second partition portion 232 in a direction perpendicular to the lower surface 211. For example, the crosstalk can be further reduced by increasing the areas of the partition wall PW outside the insulating housing 210.

The receptacle connector 200 may further include an electrically conductive the shell 240 housing the insulating housing 210, and the ground contact 230 may further include the shell contact portion 231*b* contacting the shell 240. The crosstalk may further be reduced by further stabilizing the potential of the ground contact 230.

The shell 240 may include the upper plate 244 sandwiching the insulating housing 210 with the circuit board CB, and the shell contact portion 231*b* may contact the upper plate 244. The crosstalk may further be reduced by forming the partition wall PW over the entire height from the circuit board CB to the upper plate 244.

The insulating housing 210 may include the upper surface 212 that is the opposite surface of the lower surface 211. The upper plate 244 may include: the base portion 244*a* covering at least a portion of the upper surface 212; and the projecting portion 244*b* projecting from the base portion 244*a* to sandwich the first partition portion 231 with the circuit board CB. The shell contact portion 231*b* may be formed on the first partition portion 231 to contact the projecting portion 244*b*. The shell contact portion 231*b* may contact more firmly the upper plate 244 by the elasticity of the projecting portion 244*b*.

The receptacle connector 200 may include a plurality of ground contacts 230. Each of the ground contacts 230 may include the first partition portion 231 and the second partition portion 232. The upper plate 244 may include a plurality of the projecting portion 244*b*. Each of the projecting portions 244*b* may project from the base portion 244*a* so as to sandwich the first partition portion 231 of the ground contact 230 with the circuit board CB. The shell contact portion 231*b* of each of the ground contacts 230 may contact a corresponding projecting portion 244*b*. Each of the ground contacts 230 may contact more firmly with the upper plate 244 by forming the projecting portion 244*b* for each of the ground contacts 230.

The ground contact 230 may further include the third partition portion 233 projecting from the first partition portion 231 into the insulating housing 210 and located between the second partition portion 232 and the circuit board CB. The insulating housing 210 may include the regulating portion 217 located between the second partition portion 232 and the third partition portion 233 to regulate displacement of the ground contact 230. Both the reliability of holding the ground contact 230 and the expansion of the partition wall PW in the insulating housing 210 may be achieved.

The width W1 of the first partition portion 231 in the direction perpendicular to the lower surface 211 may be greater than the sum of the width W2 of the second partition portion 232 in the direction perpendicular to the lower surface 211 and a width W3 of the third partition portion 233 in the direction perpendicular to the lower surface 211. The crosstalk may further be reduced by further increasing the areas of the partition wall PW outside the insulating housing 210.

The plug connector 100 may further include: the insulating housing 110 (the mate insulating housing) holding the signal contact 120 (the first mate signal contact), the signal contact 120 (the second mate signal contact), and the ground contact 130 (the mate ground contact); and the conductive shell 140 (the mate shell). The third partition portion 233 may be formed with the mate shell contact portion 233*b* contacting the shell 140. The crosstalk may further be reduced by further stabilizing the potential of the third partition portion 233 branched from the second partition portion 232.

The ground contact 130 may be located between the second partition portion 232 and the third partition portion 233. The shell 140 may include the lower plate 146 (lower mate plate) located between the ground contact 130 and the third partition portion 233. The ground contact portion 232*b* may be formed on a portion of the second partition portion 232 facing the third partition portion 233. The mate shell contact portion 233*b* may be formed on a portion of the third partition portion 233 facing the second partition portion 232. The space between the second partition portion 232 and the third partition portion 233 can be effectively utilized as a space for placing the ground contact 130 and the lower plate 146 may be placed in the space between the second partition portion 232 and the third partition portion 233, to reduce the height of the receptacle connector 200.

The shell 240 of the receptacle connector 200 may further include the lower plate 243 located between the lower plate 146 and the circuit board CB and contacting the lower plate 146. The lower plate 243 may be formed with the slit 243*c* to house the third partition portion 233. Since the mate shell contact portion 233*b* is connected to the lower plate 243 via the lower plate 146, the potential of the ground contact 230 is further stabilized. In addition, the height of the receptacle connector 200 can be reduced by arranging the third partition portion 233 on the slit 243*c*. Therefore, both further reduction of the crosstalk and reduction in height of the receptacle connector 200 may be reduced.

The ground contact 230 may further include the third partition portion 233 projecting from the first partition portion 231 into the insulating housing 210 and located between the second partition portion 232 and the circuit board CB. The ground contact 130 of the plug connector 100 may be located between the second partition portion 232 and the third partition portion 233. The shell 140 may include the lower plate 146 (the mate plate) located between the ground contact 130 and the third partition portion 233. The second partition portion 232 may include the floating portion 232*a* spaced apart from the upper plate 244. The ground contact portion 232*b* may be formed on a portion of the floating portion 232*a* facing the third partition portion 233 in the second partition portion 232. The third partition portion 233 may include the floating portion 233*a* spaced apart from the circuit board CB and the mate shell contact portion 233*b* contacting the shell 140. The mate shell contact portion 233*b* may be formed at a portion facing the second partition portion 232 in the floating portion 233*a* of the third partition portion 233 and contact the lower plate 146. The ground contact portion 232*b* may contact more firmly with the ground contact 130 by the elasticity of the second partition portion 232. In addition, the elasticity of the third partition portion 233 can be used to bring the mate shell contact portion 233*b* into more firm contact with the shell 140. Therefore, the potential of the ground contact 230 can be further stabilized.

The shell 240 may further include the rear plate 245 (the shell wall) facing the insulating housing 210 across the rear external space OS where the first connection portion 221, the second connection portion 221, and the first partition portion 231 are located. Each of the first connection portion 221, the second connection portion 221, and the first partition portion 231 may face the rear plate 245 with a gap in the rear external space OS. Generation of the conduction noise in the receptacle connector 200 may further be suppressed by improving the characteristic impedance.

The connector device 1 according to another aspect of the present disclosure includes the receptacle connector 200 and the plug connector 100.

The connector device 1 may include the receptacle connector 200 and the plug connector 100. The shell 240 may further include the rear plate 245 (the shell wall) facing the insulating housing 210 across the rear external space OS where the first connection portion 221, the second connection portion 221, and the first partition portion 231 are located. Each of the first connection portion 221, the second connection portion 221, and the first partition portion 231 may face the rear plate 245 with a gap in the rear external space OS. The plug connector 100 may include a conductive the cover 160 covering at least a portion between the rear plate 245 and the insulating housing 210. The generation of radiation noise in the connector device 1 may further be suppressed.

The electrically conductive the cover 160 may be electrically connected to the first partition portion 231 via the upper plate 244. The crosstalk may further be reduced by further stabilizing the potential of the ground contact 230.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A connector comprising:

an insulating housing comprising a facing surface configured to face a circuit board;

a plurality of conductive contacts held by the insulating housing so as to align along an arrangement direction that is parallel to the facing surface;

a conductive shell that houses the insulating housing, wherein the plurality of conductive contacts comprise:

a first signal contact comprising a first connection portion configured to be connected to a first signal conductor of the circuit board and a first contact portion configured to contact a first mate signal contact of a mate connector;

a second signal contact comprising a second connection portion configured to be connected to a second signal conductor of the circuit board and a second contact portion configured to contact a second mate signal contact of the mate connector; and a ground contact comprising a ground connection portion configured to be connected to a ground conductor of the circuit board and a ground contact portion configured to contact a mate ground contact of the mate connector, and wherein the ground contact is located between the first signal contact and the second signal contact and extends to be perpendicular to the arrangement direction to form a partition wall between a first region including the first signal contact and a second region including the second signal contact, and wherein the ground contact further comprises a shell contact portion that contacts an inner surface of the shell.

2. The connector according to claim 1, wherein the first connection portion and the second connection portion are located outside the insulating housing when viewed from a perpendicular direction that is perpendicular to the facing surface, wherein the ground contact comprises:

a first partition portion extending to be perpendicular to the arrangement direction between the first connection portion and the second connection portion outside the insulating housing; and a second partition portion extending to be perpendicular to the arrangement direction between the first contact portion and the second contact portion inside the insulating housing, and wherein the ground connection portion is formed in the first partition portion, and the ground contact portion is formed in the second partition portion.

3. The connector according to claim 2, wherein a width of the first partition portion in the perpendicular direction is greater than a width of the second partition portion in the perpendicular direction.

4. The connector according to claim 1, wherein the shell comprises a plate extending so that the insulating housing is located between the plate and the circuit board, and wherein the shell contact portion contacts the plate.

5. The connector according to claim 2, wherein the insulating housing comprises an opposite surface of the facing surface, wherein the shell comprises a plate extending so that the insulating housing is located between the plate and the circuit board, wherein the plate comprises:

a base portion covering at least a part of the opposite surface; and a projecting portion that projects from the base portion and the first partition portion is located between the projecting portion and the circuit board, and wherein the shell contact portion is formed on the first partition portion to contact the projecting portion.

6. The connector according to claim 5, comprising a plurality of ground contacts including the ground contact, wherein each of the plurality of ground contacts comprises the first partition portion and the second partition portion, wherein the plate comprises a plurality of projecting portions including the projecting portion corresponding to the plurality of ground contacts respectively, wherein each of the plurality of projecting portions projects from the base portion and the first partition portion of each of the ground contacts is located between a corresponding projecting portion of the plurality of projecting portions and the circuit board, and wherein each of the ground contacts comprises the shell contact portion formed on the first partition portion to contact the corresponding projecting portion.

7. The connector according to claim 2, wherein the ground contact further comprises a third partition portion that projects from the first partition portion into the insulating housing and located between the second partition portion and the circuit board, and wherein the insulating housing comprises a regulating portion located between the second partition portion and the third partition portion to regulate displacement of the ground contact.

8. The connector according to claim 7, wherein a width of the first partition portion in the perpendicular direction is greater than a sum of a width of the second partition portion in the perpendicular direction and a width of the third partition portion in the perpendicular direction.

9. The connector according to claim 7, wherein the mate connector further comprises:

a mate insulating housing that houses the first mate signal contact, the second mate signal contact, and the mate ground contact; and a conductive mate shell that houses the mate insulating housing, and wherein the ground contact further comprises a mate shell contact portion configured to contact the mate shell and the mate shell contact portion is formed in the third partition portion.

10. The connector according to claim 9, wherein the mate ground contact is configured to be located between the second partition portion and the third partition portion, wherein the mate shell comprises a mate plate configured to be located between the mate ground contact and the third partition portion, wherein the ground contact portion is formed in the second partition portion to face the third partition portion, and wherein the mate shell contact portion is formed in the third partition portion to face the second partition portion.

11. The connector according to claim 10, wherein the shell further comprises a contact plate configured to be located between the mate plate and the circuit board and contact the mate plate, and wherein a slit configured to house the third partition portion is formed in the contact plate.

12. The connector according to claim 4, wherein the mate connector further comprises:

a mate insulating housing that houses the first mate signal contact, the second mate signal contact, and the mate ground contact; and a conductive mate shell that houses the mate insulating housing, wherein the ground contact further comprises a third partition portion that projects from the first partition portion into the insulating housing and located between the second partition portion and the circuit board, wherein the mate ground contact is configured to be located between the second partition portion and the third partition portion, wherein the mate shell comprises a mate plate configured to be located between the mate ground contact and the third partition portion, wherein the ground contact further comprises a mate shell contact portion configured to contact the mate plate, wherein at least a part of the second partition portion is spaced apart from the plate, and the ground contact portion is formed in the part of the second partition portion to face the third partition portion, and wherein at least a part of the third partition portion is spaced apart from the circuit board, and the mate shell contact portion is formed in the part of the third partition portion to face the second partition portion.

13. The connector according to claim 2, wherein the shell further comprises a shell wall extending along the arrangement direction and the perpendicular direction to face the insulating housing, and wherein each of the first connection portion, the second connection portion, and the first partition portion is located between the shell wall and the insulating housing and faces the shell wall with a gap.

14. A connector device comprising:

the connector according to claim 1; and the mate connector.

15. The connector device according to claim 14, wherein the mate connector further comprises:

a mate insulating housing that houses the first mate signal contact, the second mate signal contact, and the mate ground contact; and a conductive mate shell that houses the mate insulating housing, wherein the first connection portion and the second connection portion are located outside the insulating housing when viewed from a perpendicular direction that is perpendicular to the facing surface, wherein the ground contact comprises:

a first partition portion extending to be perpendicular to the arrangement direction between the first connection portion and the second connection portion outside the insulating housing;

a second partition portion extending to be perpendicular to the arrangement direction between the first contact portion and the second contact portion inside the insulating housing;

a third partition portion that projects from the first partition portion into the insulating housing and located between the second partition portion and the circuit board; and a mate shell contact portion configured to contact the mate shell, and wherein the ground connection portion is formed in the first partition portion, and the ground contact portion is formed in the second partition portion, and wherein the mate shell contact portion is formed in the third partition portion.

16. The connector device according to claim 14, further comprising a conductive shell that houses the insulating housing, wherein the first connection portion and the second connection portion are located outside the insulating housing when viewed from a perpendicular direction that is perpendicular to the facing surface, wherein the ground contact comprises:

a first partition portion extending to be perpendicular to the arrangement direction between the first connection portion and the second connection portion outside the insulating housing;

a second partition portion extending to be perpendicular to the arrangement direction between the first contact portion and the second contact portion inside the insulating housing; and a shell contact portion that contacts an inner surface of the shell, wherein the ground connection portion is formed in the first partition portion, and the ground contact portion is formed in the second partition portion, wherein the shell comprises a plate extending so that the insulating housing is located between the plate and the circuit board, and wherein the shell contact portion contacts the plate.

17. The connector device according to claim 16, wherein the mate connector further comprises:

a mate insulating housing that houses the first mate signal contact, the second mate signal contact, and the mate ground contact; and a conductive mate shell that houses the mate insulating housing, wherein the ground contact further comprises a third partition portion that projects from the first partition portion into the insulating housing and located between the second partition portion and the circuit board, wherein the mate ground contact is configured to be located between the second partition portion and the third partition portion, wherein the mate shell comprises a mate plate configured to be located between the mate ground contact and the third partition portion, wherein the ground contact further comprises a mate shell contact portion configured to contact the mate plate, wherein at least a part of the second partition portion is spaced apart from the plate, and the ground contact portion is formed in the part of the second partition portion to face the third partition portion, and wherein at least a part of the third partition portion is spaced apart from the circuit board, and the mate shell contact portion is formed in the part of the third partition portion to face the second partition portion.

18. The connector device according to claim 16, wherein the shell further comprises a shell wall extending along the arrangement direction and the perpendicular direction to face the insulating housing, wherein each of the first connection portion, the second connection portion, and the first partition portion is located in a space between the shell wall and the insulating housing and faces the shell wall with a gap in the space, and wherein the mate connector further comprises a conductive cover configured to cover at least a part of the space between the shell wall and the insulating housing.

19. The connector device according to claim 18, wherein the conductive cover is configured to be electrically connected to the first partition portion via the plate.

20. A connector comprising:

an insulating housing comprising a facing surface configured to face a circuit board; and a plurality of conductive contacts held by the insulating housing so as to align along an arrangement direction that is parallel to the facing surface, wherein the plurality of conductive contacts comprise:

a first signal contact comprising a first connection portion configured to be connected to a first signal conductor of the circuit board and a first contact portion configured to contact a first mate signal contact of a mate connector;

a second signal contact comprising a second connection portion configured to be connected to a second signal conductor of the circuit board and a second contact portion configured to contact a second mate signal contact of the mate connector; and a ground contact comprising a ground connection portion configured to be connected to a ground conductor of the circuit board and a ground contact portion configured to contact a mate ground contact of the mate connector, wherein the ground contact is located between the first signal contact and the second signal contact and extends to be perpendicular to the arrangement direction to form a partition wall between a first region including the first signal contact and a second region including the second signal contact, wherein the first connection portion and the second connection portion are located outside the insulating housing when viewed from a perpendicular direction that is perpendicular to the facing surface, wherein the ground contact comprises:

a first partition portion extending to be perpendicular to the arrangement direction between the first connection portion and the second connection portion outside the insulating housing; and a second partition portion extending to be perpendicular to the arrangement direction between the first contact portion and the second contact portion inside the insulating housing, and wherein the ground connection portion is formed in the first partition portion, and the ground contact portion is formed in the second partition portion.

* * * * *